(No Model.)
W. B. HOLLINGSHEAD.
SECONDARY BATTERY.
No. 439,594. Patented Oct. 28, 1890.
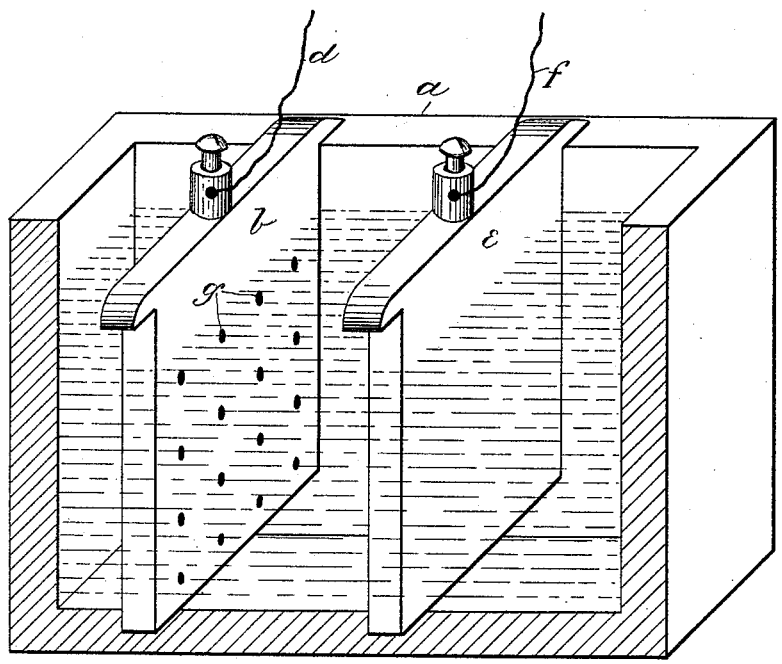
WITNESSES:
Ernst Lundgren
H. J. Morgan
INVENTOR:
Wm B Hollingshead
By A P Thayer.
atty.

United States Patent Office.

WILLIAM B. HOLLINGSHEAD, OF BRONXVILLE, ASSIGNOR OF ONE-HALF TO SYDNEY H. CARNEY, OF NEW YORK, N. Y.

SECONDARY BATTERY.

SPECIFICATION forming part of Letters Patent No. 439,594, dated October 28, 1890.

Application filed May 29, 1890. Serial No. 353,539. (No model.)

*To all whom it may concern:*

Be it known that I, WILLIAM B. HOLLINGSHEAD, a citizen of the United States, and a resident of Bronxville, in the county of Westchester and State of New York, have invented new and useful Improvements in Storage or Secondary Batteries, of which the following is a specification.

My invention consists in oxide of iron applied to iron or steel in mass, scale, or other form, and having a suitable conductor as one of the elements, and a plate of iron or steel, and also having a suitable conductor as the other element, both suspended or immersed in an alkaline solution, as hereinafter more fully described, reference being made to the accompanying drawing, which represents a sectional elevation of the cell of my improved battery in perspective view.

A represents the cell; $b$, a plate of iron or steel, or it may be iron scale or other form, to which the oxide of iron is to be applied in any approved way and either in mass, scale, or other form. In this example it is represented as applied in masses. Pressed into cells or perforations $g$ of the plate $d$ is the conductor. E represents the other element, consisting of a plain iron or steel plate with a conductor $f$.

The electrolyte consists of an alkaline solution.

I claim—

In a storage-battery, one element consisting of oxide of iron applied to iron or steel and having a suitable conductor, in combination with another plate or body of iron or steel also having a suitable conductor, and an electrolyte consisting of an alkaline solution, substantially as described.

In testimony that I claim the foregoing as my invention I have signed my name, in presence of two witnesses, this 5th day of May, 1890.

WM. B. HOLLINGSHEAD.

Witnesses:
W. J. MORGAN,
W. B. EARLL.